(12) United States Patent
Long et al.

(10) Patent No.: US 8,507,098 B2
(45) Date of Patent: Aug. 13, 2013

(54) WEAR RESISTANT COATINGS AND TILES AND METHODS OF MAKING SAME

(75) Inventors: Thomas Long, Fate, TX (US); Claudio Ansaloni, Sassuolo (IT); Massimo Sernesi, Corticella di Reggio Emilia (IT); David A. Earl, Flower Mound, TX (US)

(73) Assignees: Mohawk Carpet Corporation, Calhoun, GA (US); Intercolor S.p.A., Sassuolo, Emilia-Romagna (IT)

( * ) Notice: Subject to any disclaimer, the term of this patent is extended or adjusted under 35 U.S.C. 154(b) by 320 days.

(21) Appl. No.: 12/465,529

(22) Filed: May 13, 2009

(65) Prior Publication Data

US 2009/0311538 A1    Dec. 17, 2009

Related U.S. Application Data

(60) Provisional application No. 61/052,977, filed on May 13, 2008.

(51) Int. Cl.
  *C03C 10/06*    (2006.01)
  *C03C 8/02*     (2006.01)

(52) U.S. Cl.
  USPC ........... 428/426; 428/701; 428/702; 428/432; 501/8; 501/17; 501/21; 501/26; 501/69; 501/70

(58) Field of Classification Search
  USPC ............................................................ 501/8
  See application file for complete search history.

(56) References Cited

U.S. PATENT DOCUMENTS

| | | | | |
|---|---|---|---|---|
| 3,561,984 | A | * | 2/1971 | Eppler .......................... 428/428 |
| 4,360,567 | A | * | 11/1982 | Guillevic ...................... 428/410 |
| 4,839,313 | A | | 6/1989 | Kondo et al. |
| 5,023,207 | A | | 6/1991 | MacDowell |
| 2003/0162646 | A1 | | 8/2003 | Kawamura et al. |
| 2003/0228967 | A1 | | 12/2003 | Bitossi et al. |

FOREIGN PATENT DOCUMENTS

| | | |
|---|---|---|
| EP | 0303402 | 2/1989 |
| EP | 0931773 | 7/1999 |
| JP | 2001-192865 | 7/2001 |

OTHER PUBLICATIONS

Yoshida et al., machine translation of JP 2001-192865, Jul. 2001.*
European Search Report and Written Opinion for European Patent Application No. EP 09006459 dated Aug. 10, 2009.

* cited by examiner

*Primary Examiner* — David Sample
(74) *Attorney, Agent, or Firm* — Troy S. Kleckley, Esq.; Troutman Sanders LLP

(57) ABSTRACT

The various embodiments of the present invention are directed to wear resistant coatings, tiles having the wear resistant coatings disposed thereon, and to methods of making the coatings and tiles. A wear resistant coating generally includes a strontium aluminosilicate glass-ceramic composition that is formed from a glaze. The glaze can include a crystallizing component, which itself can include strontium, aluminum, and silicon, but also comprises less than about 2 weight percent each of lithium, boron, barium, sodium, iron, titanium, zirconium, and carbon, based on a total weight of the crystallizing component.

16 Claims, 5 Drawing Sheets

WEAR RESISTANT COATINGS AND TILES AND METHODS OF MAKING SAME

CROSS-REFERENCE TO RELATED APPLICATION

The present application claims the benefit of U.S. Provisional Patent Application Ser. No. 61/052,977 filed 13 May 2008, and entitled "Wear Resistant Coatings and Tiles and Methods of Making Same," which is hereby incorporated by reference in its entirety as if fully set forth below.

TECHNICAL FIELD

The various embodiments of the present invention relate generally to wear resistant coatings and their manufacture. More particularly, the various embodiments of the invention relate to improved wear resistant coatings for use in preparing highly wear resistant tiles, and to methods of making such coatings and tiles.

BACKGROUND

Ceramic tile may be either glazed or unglazed. A glaze is generally a glass coating, sometimes with added color, that is applied to the surface of a ceramic tile. Glazed tiles have surfaces that offer advantages such as resistance to wear, moisture, and stains. The strength and wear resistance of a glaze is generally determined by its hardness. That is, the harder the glaze, the better it will resist pressure and abrasion.

In addition, the wear resistance performance of traditional glazes is dependent in part on the color of the surface, where lighter colored glazes generally perform better than darker ones. Consequently, product design for high wear resistant products has been limited to light colors. Other alternative glaze technologies have been developed to provide improved wear resistance. These technologies, however, increase production costs or limit the range of appearance that can be achieved in the final tile products.

For example, many of these alternative technologies are based on glass-ceramic coatings or glazes. Frequently, the refractive indices of the resulting glass-ceramic coatings are high, resulting in high opacity, which limits the range of visual characteristics that can be achieved in the final tile product. In addition, some of these systems have coefficients of thermal expansion that are lower than those observed for ceramic tiles. This mismatch between the coating and the tile substrate can result in deformation of the tile or coverage defects such as crazing or crawling.

Accordingly, there is a need for improved wear resistant coatings or glazes for ceramic tiles. It is to the provision of such coatings, and the associated wear resistant tiles that the various embodiments of the present invention are directed.

BRIEF SUMMARY

Various embodiments of the present invention are directed to improved wear resistant coatings. Other embodiments are directed to ceramic tiles having the wear resistant glazes disposed thereon. Still other embodiments are directed to methods of making the coatings and tiles.

Broadly described, the improved wear resistance can be achieved by depositing a glaze or coating on a tile, which forms into a strontium-containing aluminosilicate glass-ceramic composition during the manufacturing firing cycle. The coating can be applied to the tile as a dry glaze of glass frit powders in a dry granular state. Alternatively, the coating can be applied to the tile in the form of a wet glaze. In certain embodiments, the dry or wet glaze can be formed from multiple components, where each of the components contributes to the improved product performance in different ways. In those embodiments (i.e., where the glaze, wet or dry, comprises multiple components), the primary component, referred to herein as the "crystallizing component," includes the specific chemical components necessary to yield the desired strontium-containing aluminosilicate glass-ceramic crystalline phase. The strontium-containing aluminosilicate offers the advantage of mechanical resistance while retaining an acceptable degree of transparency. In embodiments where the glaze is not a mixture of components, the crystallizing component is the only component of the glaze.

In certain embodiments, the glaze can include a flux material. This additional component of the glaze, referred to herein as a "flux component," can be used to achieve the desired aesthetic characteristics of the final coating. In addition, the optional flux component can be tailored to ensure that other desired ceramic tile properties (e.g., slip resistance) are achieved. In certain embodiments, more than one flux component can be used to form the glaze.

The glaze can be applied directly to the surface of a ceramic tile body. Alternatively, before the glaze is applied to the tile, an optional underlayer glaze can be applied via a wet method. The underlayer glaze can be designed to interact with the glaze during firing to produce the desired effects. In addition, the underlayer glaze on which the glaze is applied can have certain characteristics in order to achieve improved wear resistance performance. For example, the underlayer glaze can maintain a sufficiently high surface tension and/or a high-temperature melting behavior effective to support the glaze on the surface of the tile throughout the firing process.

In accordance with some embodiments of the present invention, a wear resistant coating includes a strontium aluminosilicate glass-ceramic composition that is formed from a glaze that comprises a crystallizing component, wherein the crystallizing component comprises strontium, aluminum, and silicon, and wherein the crystallizing component comprises less than about 2 weight percent each of lithium, boron, barium, sodium, iron, titanium, zirconium, and carbon, based on a total weight of the crystallizing component.

The crystallizing component of the wear resistant coating can further comprise one or more of: calcium, potassium, magnesium, or zinc.

The strontium aluminosilicate glass-ceramic composition of the wear resistant coating can be $Sr(Al_2Si_2O_8)$.

The glaze of the wear resistant coating can further comprise a flux component, wherein the flux component comprises aluminum, silicon, sodium, calcium, potassium, and magnesium, and wherein the flux component comprises less than about 2 weight percent each of lithium, boron, barium, iron, titanium, phosphorus, zinc, and carbon. The flux component can further comprise zirconium.

The glaze of the wear resistant coating can comprise about 85 to about 97 weight percent of the crystallizing component and about 3 to about 15 weight percent of the flux component, based on a dry weight of the glaze.

The wear resistant coating can have an abrasion resistance of Class 4 or 5 as measured according to ASTM C1027-99 for all lightness values (L*) of greater than or equal to about 33 as measured using a CIE color space equation.

According to other embodiments of the present invention, a coated tile can include a ceramic tile, and a wear resistant coating disposed on a surface of the ceramic tile, wherein the wear resistant coating comprises a strontium aluminosilicate glass-ceramic composition that is formed from a glaze that comprises a crystallizing component, wherein the crystallizing component comprises strontium, aluminum, and silicon, and wherein the crystallizing component comprises less than about 2 weight percent each of lithium, boron, barium, sodium, iron, titanium, zirconium, and carbon, based on a total weight of the crystallizing component.

The crystallizing component of the coated tile can further comprise one or more of: calcium, potassium, magnesium, or zinc.

The strontium aluminosilicate glass-ceramic composition of the coated tile can be $Sr(Al_2Si_2O_8)$.

The glaze of the coated tile can further comprise a flux component, wherein the flux component comprises aluminum, silicon, sodium, calcium, potassium, and magnesium, and wherein the flux component comprises less than about 2 weight percent each of lithium, boron, barium, iron, titanium, phosphorus, zinc, and carbon. The flux component of the coated tile can further comprise zirconium.

The coated tile can further comprise an underlayer glaze interposed between the wear resistant coating and the surface of the ceramic tile. The underlayer glaze can comprise silicon, aluminum, sodium, and potassium, and wherein the underlayer glaze comprises less than about 2 weight percent each of lithium, boron, barium, iron titanium, phosphorus, and magnesium. The underlayer glaze can further comprise one or more of calcium, zinc or carbon.

The wear resistant coating of the coated tile can have an abrasion resistance of Class 4 or 5 as measured according to ASTM C1027-99 for all lightness values (L*) of greater than or equal to about 33 as measured using a CIE color space equation.

A method of making a wear resistant coating, in accordance with some embodiments of the present invention, includes applying a glaze to a surface of a ceramic tile, wherein the glaze comprises a crystallizing component, wherein the crystallizing component comprises strontium, aluminum, and silicon, and wherein the crystallizing component comprises less than about 2 weight percent each of lithium, boron, barium, sodium, iron, titanium, zirconium, and carbon, based on a total weight of the crystallizing component; and exposing the ceramic tile with the glaze disposed thereon to a firing cycle effective to produce a wear resistant coating comprising a strontium aluminosilicate glass-ceramic composition from the glaze.

The firing cycle used in the method of making a wear resistant coating can be a fast-fire process.

The glaze used in the method of making a wear resistant coating can further comprise a flux component, wherein the flux component comprises aluminum, silicon, sodium, calcium, potassium, and magnesium, and wherein the flux component comprises less than about 2 weight percent each of lithium, boron, barium, iron, titanium, phosphorus, zinc, and carbon.

The method of making a wear resistant coating can further comprise applying an underlayer glaze to the surface of the ceramic tile before applying the glaze to the surface of the ceramic tile such that the glaze is applied on the underlayer glaze.

Other aspects and features of embodiments of the present invention will become apparent to those of ordinary skill in the art, upon reviewing the following detailed description in conjunction with the accompanying figures.

DETAILED DESCRIPTION

Figure 1:
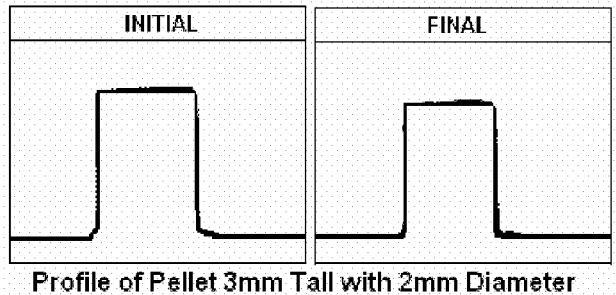
FIG. 1 illustrates, using hot stage microscopy, the firing behavior of an underlayer glaze for an approximately 3 millimeter tall pellet having a diameter of approximately 2 millimeters.

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Disclosed herein are wear resistant coatings or glazes, highly wear resistant tiles, and methods of making the coatings and the tiles. The coatings described herein can enable ceramic tiles to exhibit higher wear or abrasion resistance, which can be measured, for example, according to ASTM C1027. The superior wear performance resulting from the coatings, tiles, and methods described herein can be attained over the full range of tile colors. Further, it will become apparent to those skilled in the art to which this disclosure pertains that in certain instances, the coatings can exhibit less impairment (relative to existing coatings) of wear resistance with increasing darkness of product color.

As described above, the final wear resistant coatings generally include a strontium-containing aluminosilicate glass-ceramic crystalline composition. The strontium-containing aluminosilicate coatings can be produced by disposing a glaze onto a tile. In some embodiments, the glaze is disposed onto an underlayer glaze which is already disposed on the surface of the tile. The glaze includes a crystallizing component, and can further include an optional flux component and/or other optional components.

The crystallizing component is selected to include the specific chemical components that will produce the desired strontium-containing aluminosilicate glass-ceramic crystalline phase during processing. Thus, the crystallizing component should at least contain strontium (Sr), aluminum (Al), and silicon (Si), each of which can be present in elemental form or as a compound composition. Other constituents of the crystallizing component can include calcium (Ca), potassium (K), magnesium (Mg), zinc (Zn), and the like. In exemplary embodiments, the constituents of the crystallizing component are present in the form of oxides, which can be simple oxides or complex oxides containing two or more cations.

It should be noted that certain elements, whether present in elemental form or as compound compositions, can adversely affect the desired coating properties. These elements, which are not intended to be included in the crystallizing component, include lithium (Li), boron (B), barium (Ba), sodium (Na), iron (Fe), titanium (Ti), zirconium (Zr) and carbon (C).

In one instance, the crystallizing component includes a mixture of oxides comprising $SiO_2$, $Al_2O_3$, CaO, SrO, $K_2O$, MgO, and ZnO. In such a mixture, the $SiO_2$ can comprise about 45 to about 55 weight percent (wt. %), the $Al_2O_3$ can comprise about 20 to about 25 wt. %, the CaO can comprise about 8 to about 10 wt. %, the SrO can comprise about 5 to about 10 wt. %, the $K_2O$ can comprise about 3 to about 6 wt. %, the MgO can comprise about 2 to about 3 wt. %, and the ZnO can comprise up to about 2 wt. %, based on the total weight of the mixture.

A few minority constituents, which are present in the form of unwanted impurities, can occasionally be found in the crystallizing component. These unwanted impurities can include some of the elements that are not intended to be included in the crystallizing component listed above. Owing to the nature of the starting materials, however, these unwanted impurities can each be present in amounts of up to about 2 wt. % based on the total weight of the crystallizing component. In exemplary embodiments, these impurities are only present in amounts of up to about 1 wt. %. Specific examples of these unwanted impurities include $Na_2O$, $Fe_2O_3$, $TiO_2$, $ZrO_2$, and elemental carbon. It should be noted that, while present, these constituents are not intentionally added to the crystallizing component.

The glaze can include one or more optional flux components, which can be mixed with the crystallizing component. The flux component can be tailored to produce the desired visual characteristics of the final coating and/or to ensure that any other desired tile properties are achieved. With respect to the visual or optical characteristics, the coatings (and ultimately the tiles) can be produced to vary from a high contrast finish to a low contrast or uniform contrast finish. The flux component generally contains Al, Si, Na, Ca, K, and Mg, each of which can be present in elemental form or as a compound composition. Another constituent that can be included in the flux component in certain situations is Zr. In exemplary embodiments, as with exemplary embodiments of the crystallizing component, the constituents of the flux component are present in the form of oxides, which can be simple oxides or complex oxides containing two or more cations.

Just as was the case for the crystallizing component, there are certain elements, whether present in elemental form or as compound compositions, that are not intended to be included in the flux component. These elements include Li, B, Ba, Fe, Ti, phosphorus (P), Zn, and C. Again, however, owing to the nature of the starting materials, these unwanted elements, in addition to other impurities, can each be present in amounts of up to about 2 wt. % based on the total weight of the flux component. In exemplary embodiments, these impurities are only present in amounts of up to about 1 wt. %. It is to be understood that these constituents, however, are not intentionally added to the flux component.

In one instance, when a high contrast finish (e.g., glossy coating on a matte tile) is desired for the tile, a strong flux component can be utilized. The strong flux component can include $SiO_2$, $Na_2O$, $Al_2O_3$, CaO, and $K_2O$, such that $SiO_2$ and $Na_2O$ comprise more than 75 wt. % of the flux component. In another instance, on the opposite end of the visual spectrum when a low contrast or uniform contrast finish (e.g., glossy coating on a glossy tile, matte coating on a matte tile, or the like) is desired for the tile, a weak flux component can be utilized. The weak flux component can include $SiO_2$, $Na_2O$, $Al_2O_3$, CaO, $K_2O$, and $ZrO_2$, such that $SiO_2$, CaO, and $Al_2O_3$ comprise more than about 80 wt. % of the flux component. Of course, if an intermediate visual effect is desired, the amount of each component of the flux can be varied appropriately. It should be noted that a uniform appearance can also be obtained using the strong flux component. This can be achieved, for example, by adjusting the particle size and the amount of the flux component in the glaze.

Once the specific constituents for the crystallizing component and the flux component are determined, the components can be combined to form the glaze. The amount of each component will vary according to the desired visual effects, wear resistance desired, and processing conditions. For example, if a high contrast finish is desired for the tile, low quantities (e.g., up to about 5 wt. % based on the total dry weight of the glaze, regardless of whether it is a dry glaze or wet glaze) of the strong flux component can generally be used. If a low contrast or uniform contrast finish is desired, however, higher quantities (e.g., up to about 20 wt. % based on the total dry weight of the glaze, regardless of whether it is a dry glaze or wet glaze) of the weak flux component can generally be used. The particle size, which will be discussed in terms of the average of the longest dimension of each particle in a sample, of the crystallizing component can be about 150 to about 250 micrometers ($\mu$m) in exemplary embodiments. When a strong or weak flux component is used, the particle size can be about 350 to about 450 $\mu$m in exemplary embodiments. Naturally, as mentioned above, the particle sizes can be varied depending on the effects desired.

Once the glaze has been prepared, it can be applied to a surface of a tile, which can have the optional underlayer glaze already disposed thereon. When the glaze that results in the strontium aluminosilicate coating is a dry glaze, prior to application of that dry glaze, the surface is prepared by disposing thereon an organic polymer binder, which is used to promote adhesion of the dry glaze to the surface of the tile (or the optional underlayer glaze). Selection of binder can be made based on the desired final properties of the tile. The glaze, whether in the form of the crystallizing component alone or as a mixture containing the crystallizing and flux components, can be applied as a uniform layer of dry granular particles. This can be accomplished using existing dry glaze application techniques known to those skilled in the art to which this disclosure pertains.

When the glaze that results in the strontium aluminosilicate coating is a wet glaze, an organic polymer binder is not necessary. The wet glaze can be formed by, for example, suspending the dry granular particles of the crystallizing component (and optional flux component) in a liquid or aqueous vehicle. Other methods of making wet glazes would be understood by those skilled in the art to which this disclosure pertains. The wet glaze, whether formed from the crystallizing component alone or as a mixture containing the crystallizing and flux components, can be applied directly on the surface of the tile (or the optional underlayer glaze). This can be accomplished using existing wet glaze application techniques known to those skilled in the art to which this disclosure pertains.

The amount of the mixture applied to the surface of the tile (or underlayer glaze), regardless of whether the glaze is a wet or dry glaze, can range from about 5 to about 100 grams per fired square foot of tile, based on the dry weight of the glaze itself.

Upon firing, the underlayer glaze can be used to facilitate bonding between the wear resistant coating and the tile itself. This layer can also have certain characteristics in order to contribute to the improved wear resistance of the tile. For example, in certain embodiments, the underlayer glaze can have a high melting temperature and maintain a sufficiently high surface tension so as to support the glaze on the surface of the tile throughout the firing process.

By way of illustration, the hot stage microscopy images shown in FIG. 1 demonstrate the melting behavior of an exemplary underlayer glaze. These images provide the profile of an approximately 3 millimeter (mm) tall pellet of the underlayer glaze having an approximately 2 mm diameter before and after firing to about 1207 degrees Celsius (° C.). As observed in FIG. 1, the retention of the original shape indicates the ability of the underlayer glaze to properly support the glaze during firing.

The refractory nature of the underlayer glaze, as exemplified in FIG. 1, can be beneficial since the underlayer glaze can be used to prevent the glaze from melting or seeping directly into the tile during processing, while simultaneously enhancing the bond between the coating and the tile itself.

The underlayer glaze can be formed from a mixture of oxides including $SiO_2$, $Al_2O_3$, $Na_2O$, and $K_2O$. In certain embodiments, the underlayer glaze can include Ca, Zn, or C. As with the components of the wear resistant coating, the underlayer glaze can also include certain elements, whether present in elemental form or as compound compositions, that are not intended to be included therein. These elements include Li, B, Ba, Fe, Ti, P, and Mg. Again, however, owing to the nature of the starting materials, these unwanted elements, in addition to other impurities, can each be present in amounts of up to about 2 wt. % based on the total weight of the underlayer glaze. In exemplary embodiments, these impurities are only present in amounts of up to about 1 wt. %. It is to be understood that these constituents, however, are not intentionally added to the underlayer glaze.

The underlayer glaze can be applied to the tile surface using any of a number of existing wet glaze application techniques known to those skilled in the art to which this disclosure pertains.

By way of example, Table 1 provides but one illustration of the amounts of each constituent for an exemplary crystallizing component, an exemplary strong flux component, an exemplary weak flux component, and an exemplary underlayer glaze.

After the wet or dry glaze is applied to the tile, the tile is subjected to a firing cycle that is effective to produce the wear resistant coating from the glaze. Any of a number of existing ceramic firing processes known to those skilled in the art to which this disclosure pertains can be used. In an advantageous feature of certain embodiments of the present invention, slow cooling cycles (e.g., cooling at a rate of less than or equal to about 40° C. per minute) are not necessary in order to promote crystallization of the strontium-containing aluminosilicate composition.

TABLE 1

Chemical compositions for representative crystallizing component, strong and weak flux components, and underlayer glaze

| Compound | Crystallizing Component WT. % | Strong Flux Component WT. % | Weak Flux Component WT. % | Underlayer Glaze WT. % |
|---|---|---|---|---|
| SiO2 | 45 to 55 | 50 to 65 | 40 to 55 | 50 to 75 |
| Al2O3 | 20 to 25 | 5 to 8 | 12 to 18 | 15 to 25 |
| Na2O | 0 to 2 | 20 to 25 | 0 to 3 | 2 to 6 |
| Fe2O3 | 0 to 1 | 0 to 1 | 0 to 1 | 0 to 1 |
| TiO2 | 0 to 1 | 0 to 1 | 0 to 1 | 0 to 1 |
| K2O | 3 to 6 | 3 to 6 | 0 to 2 | 0 to 2 |
| P2O5 | 0 to 1 | 0 to 1 | 0 to 1 | 0 to 1 |
| MgO | 2 to 3 | 0 to 3 | 0 to 2 | 0 to 1 |
| CaO | 8 to 10 | 4 to 7 | 20 to 30 | 0 to 10 |
| ZrO2 | 0 to 1 | 0 to 1 | 5 to 15 | 0 to 1 |
| ZnO | 0 to 2 | 0 to 1 | 0 to 1 | 0 to 5 |
| BaO | 0 to 1 | 0 to 1 | 0 to 1 | 0 to 1 |
| SrO | 5 to 10 | 0 to 1 | 0 to 1 | 0 to 1 |
| Carbon | 0 to 1 | 0 to 1 | 0 to 1 | 0 to 2 |
| LOI | 0 to 1 | 0 to 1 | 0 to 1 | 2 to 10 |
| Sum | 100 | 100 | 100 | 100 |

* LOI = loss on ignition from firing cycle

In exemplary embodiments, the firing cycle can be a so-called "fast-fire" process. In these processes, the cooling rates are generally at least about 75° C. per minute. Fast-fire furnaces generally provide reduced power usage by allowing for rapid heating and cooling of the ceramic ware during a continuous firing process. Thus, in these embodiments, the manufacturing costs for the wear resistant coatings can be minimized by the use of a fast-fire process.

The strontium-containing aluminosilicate glass-ceramic coating compositions that are produced during firing can protect the final tile product beneath the coatings. The as-produced strontium-containing aluminosilicate coatings can be tailored to exhibit certain properties in addition to imparting wear resistance to the ceramic tiles. For example, they can also provide low opacity so decorations beneath the wear resistant coatings can be seen.

Figure 2:
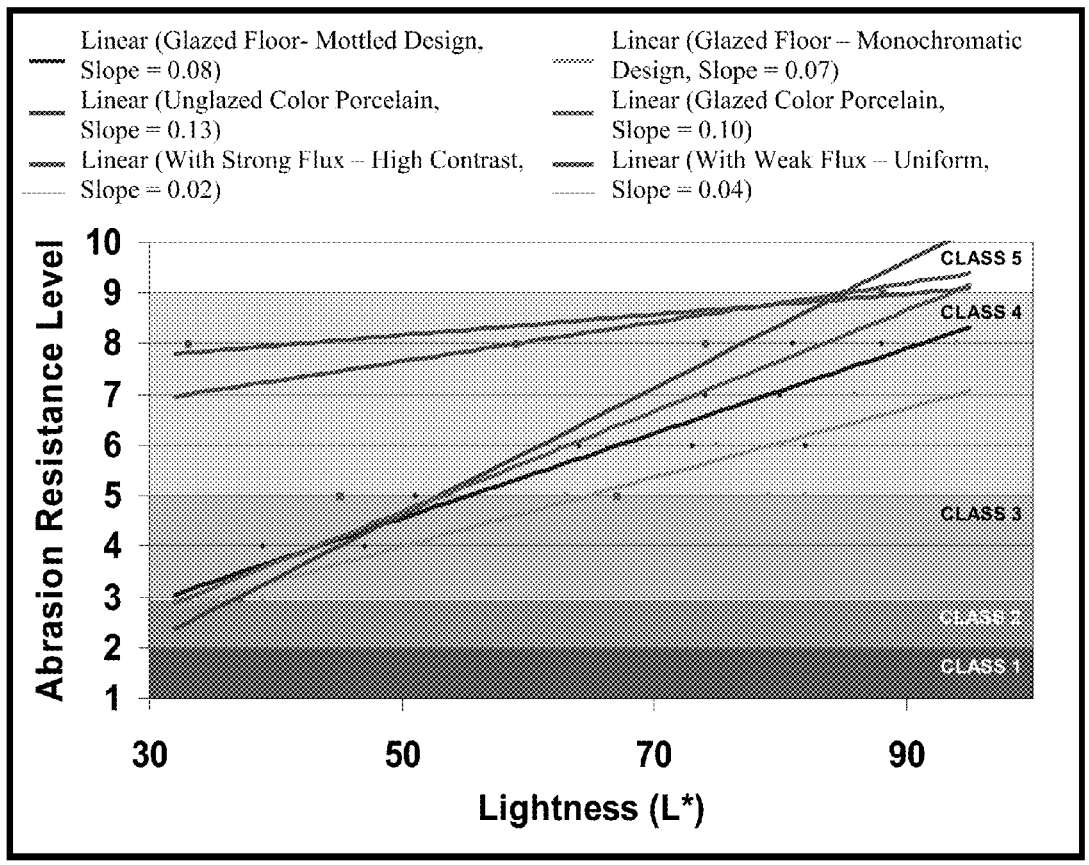
FIG. 2 graphically illustrates the abrasion resistance performance, with respect to sample color, of tiles having the wear resistant coatings according to some embodiments of the present invention and tiles made by traditional tile-making technologies.

The as-produced strontium-containing aluminosilicate coatings can also exhibit less impairment of wear resistance with increasing darkness of product color. By way of illustration, FIG. 2 presents the relationship between abrasion resistance and the lightness value of product color for various tile technologies. The "Glazed Floor—Mottled Design", "Glazed Floor—Monochromatic Design", "Unglazed Colored Porcelain" and "Glazed Color Porcelain" series represent traditional tile making technologies. "With Strong Flux—High Contrast" and "With Weak Flux—Uniform" represent the abrasion resistance performance of wear resistant coatings according to some embodiments of the present invention. Overall improvement of wear resistance is indicated by the lines representing the coatings of the present invention, which have higher levels of abrasion resistance over the full range of lightness value, L*. Lower susceptibility to loss of wear resistance with increasing darkness (decreasing L*) is shown by the lower slopes of the lines representing the coatings of the present invention compared to the lines representing traditional tile systems.

In addition, the coefficient of thermal expansion of the strontium-containing aluminosilicate coatings can be adjusted to approach or possibly match that of the underlayer glaze and/or the tile surface so as to minimize the possibility of deformation of the tile, crazing, or crawling. In fact, by including Sr and by avoiding the use of certain elements, such as Li and B, in the crystallizing component (and ultimately in the final strontium-containing aluminosilicate glass-ceramic coating composition), the substrate-coating expansion mismatch that is observed in existing glass-ceramic systems can be avoided.

An exemplary strontium-containing aluminosilicate glass-ceramic coating composition is $Sr(Al_2Si_2O_8)$. This composition enables wear resistance to be attained over the full range of tile colors and visual characteristics. Further, $Sr(Al_2Si_2O_8)$ has a coefficient of thermal expansion of about $6.27 \times 10^{-6}$, which is within the range of coefficients for existing ceramic tiles (about $6 \times 10^{-6}$ to about $8.5 \times 10^{-6}$).

The various embodiments of the present invention are further illustrated by the following non-limiting examples.

EXAMPLES

Example 1

Preparation of Wear Resistant Coatings Using Two-Component Dry Glaze

In this example, two different wear resistant glazes were produced, each providing different visual characteristics. First, a high-contrast sample was produced to have large, high gloss specs on a predominately matte background. This provided a strong contrast between the gloss and matte regions. The second sample, which was more uniform in appearance, was produced to have a uniform distribution of smaller particle size gloss specs. This provided only a subtle contrast between matte and gloss regions.

In this example, an underlayer glaze was used, and the dry glaze included both the crystallizing component and a flux component. The constituents of each component of the dry glaze and of the underlayer glaze are shown in Table 2. The crystallizing component for each sample was generally the same. Specifically, the crystallizing component included oxides of Si, Al, K, Mg, Ca, Zn, and Sr. The other constituents (i.e., oxides of Na, Fe, Ti, and Zr, as well as elemental carbon) were present only as unwanted impurities and were not intentionally included in the crystallizing component.

The underlayer glaze composition, which was also the same for each sample, was chosen such that it allowed the dry glaze to remain on the surface of the underlayer glaze without melting into the surface of the tiles during firing. As shown in Table 2, the underlayer coating included oxides of Si, Al, Na, and K. The remaining oxides shown in Table 2 were unwanted impurities that were observed to be present upon analysis.

The high-contrast sample was prepared from a blend of about 95 to about 97 wt. % of the crystallizing component and about 3 to about 5 wt. % of the strong flux component. As shown in Table 2, the strong flux component included oxides of Si, Al, Na, K, Mg, and Ca, with the other observed compositions being unwanted impurities. The blend of the crystallizing component and the strong flux component was applied at a weight equivalent of about 20 to about 25 grams per fired square foot.

TABLE 2

Chemical composition ranges for wear resistant coatings and underlayer glaze

| Compound | Crystallizing Component WT. % | Strong Flux Component WT. % | Weak Flux Component WT. % | Underlayer Glaze WT. % |
|---|---|---|---|---|
| $SiO_2$ | 48.5 to 53.8 | 55.3 to 61.3 | 44.4 to 49.2 | 67.1 to 74.4 |
| $Al_2O_3$ | 20.5 to 22.9 | 5.9 to 6.7 | 14.5 to 16.3 | 18.7 to 20.9 |
| $Na_2O$ | 0.6 to 0.9 | 20.5 to 22.9 | 1.5 to 1.8 | 4.0 to 4.6 |
| $Fe_2O_3$ | 0 to 0.2 | 0.1 to 0.3 | 0.1 to 0.3 | 0.2 to 0.4 |
| $TiO_2$ | 0 to 0.2 | 0 to 0.2 | 0 to 0.19 | 0.2 to 0.4 |
| $K_2O$ | 4.3 to 5.0 | 4.7 to 5.4 | 0.9 to 1.2 | 0.7 to 1.0 |
| $P_2O_5$ | — | 0 to 0.1 | 0 to 0.1 | 0 to 0.2 |
| MgO | 2.2 to 2.7 | 1.6 to 2.0 | 0.7 to 1.0 | — |
| CaO | 8.3 to 9.4 | 5.2 to 5.9 | 22.4 to 25.0 | 0.2 to 0.4 |
| $ZrO_2$ | 0 to 0.2 | 0.1 to 0.3 | 8.9 to 10.0 | 0 to 0.2 |
| ZnO | 1.3 to 1.7 | 0.2 to 0.5 | 0.1 to 0.3 | 0 to 0.1 |
| BaO | — | 0.0 to 0.2 | 0 to 0.2 | — |
| SrO | 7.9 to 8.9 | 0 to 0.1 | — | — |
| Carbon | 0 to 0.1 | — | 0 to 0.2 | 0 to 0.3 |
| LOI | 0.2 to 0.4 | 0.2 to 0.4 | 0.4 to 0.7 | 3.0 to 3.5 |
| Sum | 100 | 100 | 100 | 100 |

* LOI = loss on ignition from firing cycle

The uniform looking sample was prepared from a blend of about 85 to about 87 wt. % of the crystallizing component and about 13 to about 15 wt. % of the weak flux component. As shown in Table 2, the weak flux component included oxides of Si, Al, Na, K, Mg, Ca, and Zr, with the other observed compositions being unwanted impurities. The blend of the crystallizing component and the weak flux component was applied at a weight equivalent of about 20 to about 25 grams per fired square foot.

A profile of the particle sizes of each component of the blends is provided in Table 3. As shown in the Table 3, for these samples, the particle size of the flux components were significantly larger than for the crystallizing component.

TABLE 3

Particle size distribution for wear resistant coating components

| Particle Size | Crystallizing Component μm | High Contrast Flux Component μm | Uniform Flux Component μm |
|---|---|---|---|
| Mean | 193 to 214 | 386 to 427 | 395 to 437 |
| Std Dev | 91 to 100 | 189 to 208 | 194 to 215 |
| 10% Less Than | 89 to 99 | 218 to 241 | 196 to 217 |
| 25% Less Than | 133 to 147 | 279 to 308 | 277 to 307 |
| 50% Less Than | 182 to 202 | 355 to 393 | 377 to 417 |
| 75% Less Than | 243 to 268 | 445 to 492 | 485 to 536 |
| 90% Less Than | 315 to 348 | 550 to 608 | 593 to 656 |

Figure 3:
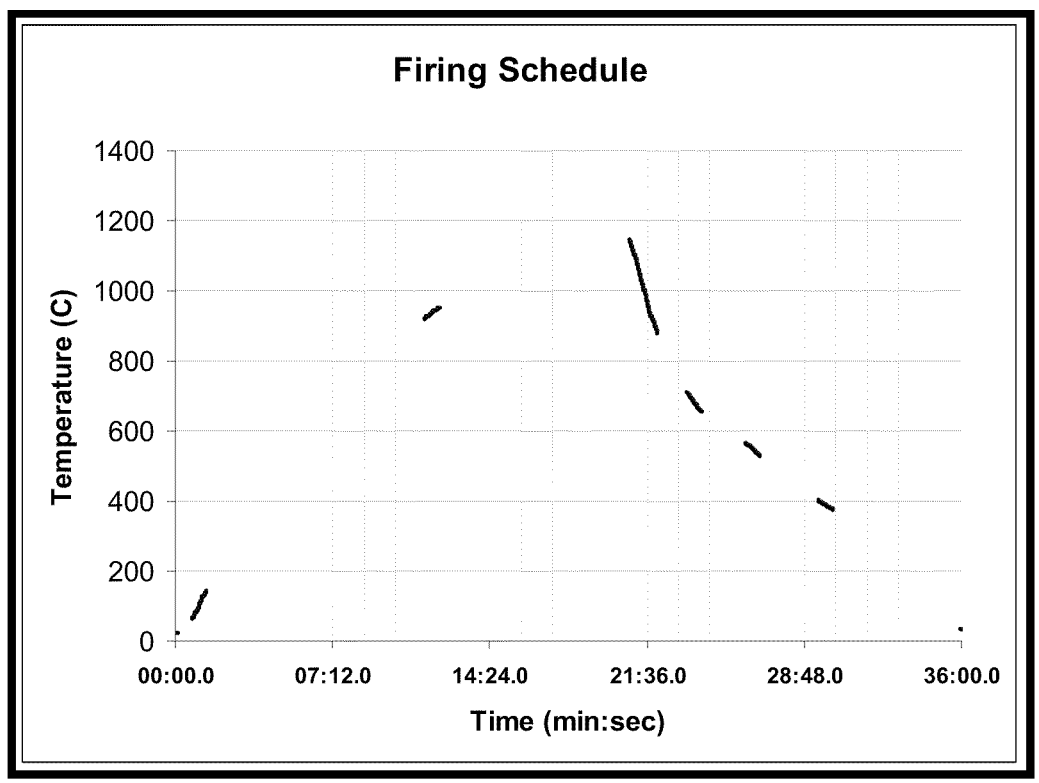
FIG. 3 graphically illustrates a heating profile for the firing cycle for the samples described in Example 1.

FIG. 3 illustrates the heating profile of the firing cycle used to prepare the samples. As shown in FIG. 3, the samples were ramped up to about 1200° C., and rapidly cooled to room temperature using a fast-fire process.

Example 2

Structural Characterization of the Wear Resistant Coatings

Various structural parameters and properties were studied in preparing the samples described according to Example 1.

Figure 4:
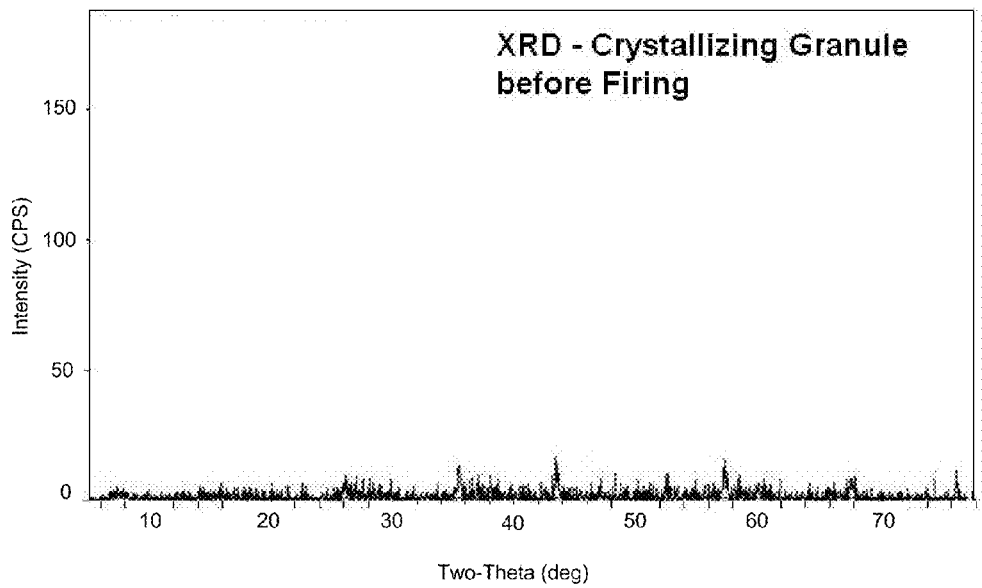
FIG. 4 is a powder X-ray diffraction pattern of an unfired crystallizing component for a sample described in Example 2.
Figure 5:
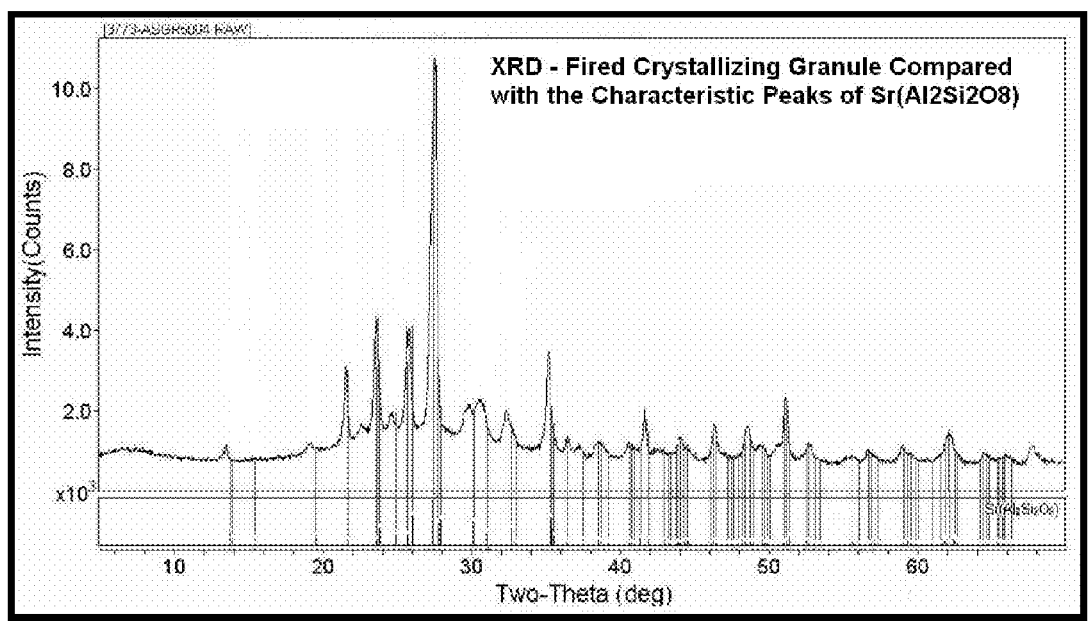
FIG. 5 is a powder X-ray diffraction pattern of an as-fired crystallizing component for a sample described in Example 2.

The development of the crystalline phase during firing can be shown by powder X-ray diffraction (XRD). FIGS. 4 and 5 provide XRD patterns of the unfired and fired crystallizing component. In the XRD pattern of the unfired crystallizing component shown in FIG. 4, no strontium aluminosilicate crystalline phase was detected (as would be evidenced by a comparison to the indexed pattern in FIG. 5). While there are peaks, which correspond to the presence of a crystalline phase, this phase is present in an insignificant amount. After firing, however, a highly crystalline structure was observed.

The XRD pattern for the fired sample of the crystallizing component is shown in FIG. 5. The pattern shown in FIG. 5 was indexed to a $Sr(Al_2Si_2O_8)$ phase.

Figure 6:
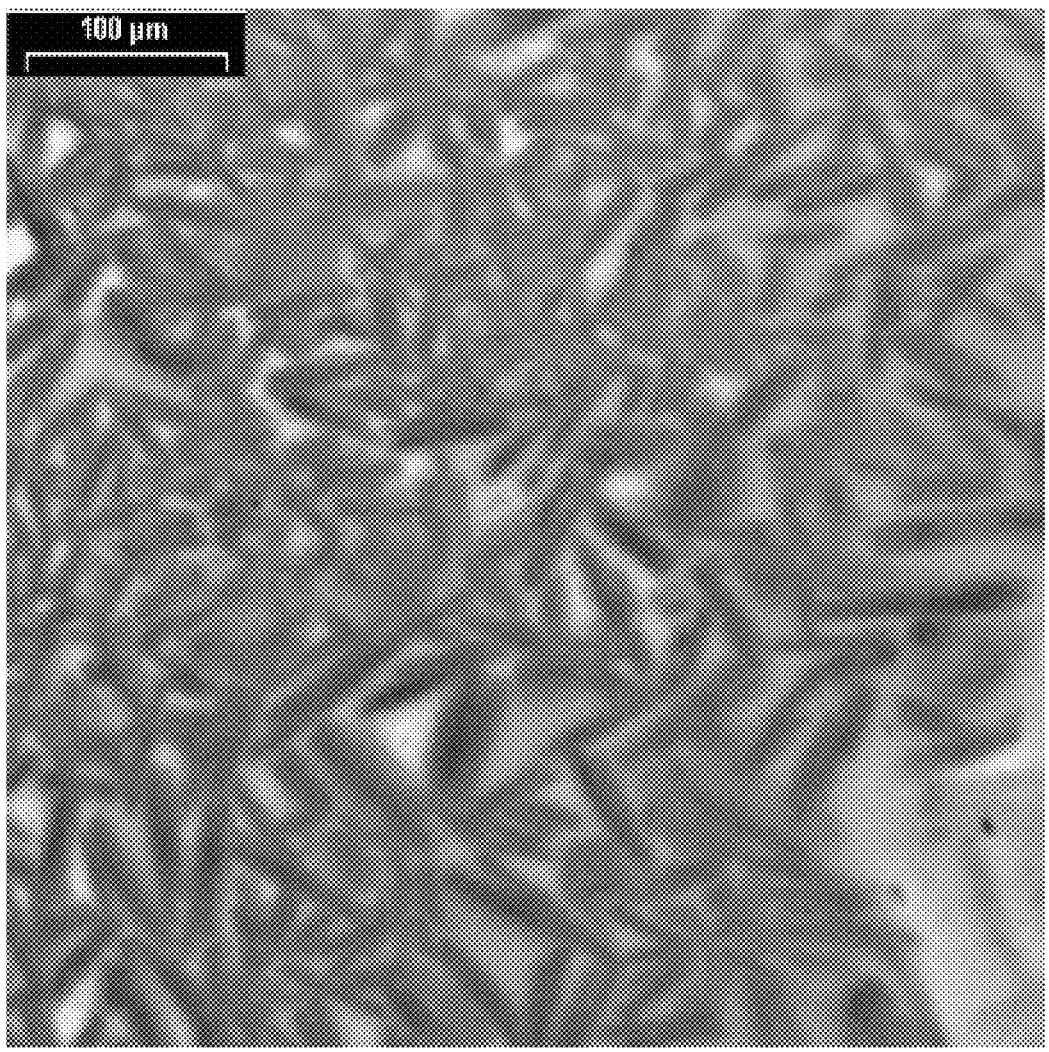
FIG. 6 is a scanning electron microscope image of a fired tile sample described in Example 2.

The morphology of the crystallites forming the high contrast coating on the tile can be seen in the scanning electron microscope (SEM) image of FIG. 6. As evidenced in FIG. 6, crystallites having an average longest dimension of less than about 100 micrometers were obtained.

Example 3

Physical Characterization of the Wear Resistant Coatings

In this example, various samples made using the strong and weak flux components were evaluated for abrasion resistance, appearance, gloss, and coefficient of friction. The various physical properties of the tiles are shown in Table 4. The data in Table 4 is for black colored tiles, which is generally the most challenging color for this technology. In general, as indicated by the data in Table 4, the abrasion performance of the black tiles increased with decreasing amounts of the flux component. An explanation of the various measurements is provided below.

tions. Data shown were calculated based on CWF2 illuminant and a 2-degree observer.

60-deg Gloss (Before Abrasion) provides a measurement of the gloss of the test sample prior to abrasion.

COF Dry and COF Wet provides a measurement of the static coefficient of friction of the sample under dry and wet conditions. These properties were measured using ASTM C1028-06 Standard Test Method for Determining the Static Coefficient of Friction of Ceramic Tile and Other Like Surfaces by the Horizontal Dynamometer Pull-Meter Method.

SCI-dE*-12k provides a measurement of the magnitude of the color change resulting from about 12,000 abrasion cycles. SCI indicates the color difference based on measurements taken with spectral component included. dE* is the measure of color difference of the CIE 1976 (L*, a*, b*) color space system. Data shown were calculated based on CWF2 illuminant and a 2-degree observer.

dGloss-12k provides a measurement of the gloss change resulting from about 12,000 abrasion cycles.

Wt-Loss-12k provides a measurement of the weight loss in grams resulting from about 12,000 abrasion cycles.

Dry Glaze Opacity % provides a measurement of the opacity of the dry glaze blend layer. The value of the property was

TABLE 4

Evaluation of wear resistance-coated tile samples

| Condition | 1 | 2 | 3 | 4 | 5 | 6 | 7 | 8 |
|---|---|---|---|---|---|---|---|---|
| TEST CONDITION | | | | | | | | |
| Under Glaze Color (L*) | Black 31 | Black 31 | Black 31 | Black 31 | Black 31 | Black 31 | Black 31 | Black 31 |
| Under Glaze Application Wt. (g/SqFt) | 44 g @ 1.6 g/cc | 44 g @ 1.6 g/cc | 44 g @ 1.6 g/cc | 44 g @ 1.6 g/cc | 44 g @ 1.6 g/cc | 44 g @ 1.6 g/cc | 44 g @ 1.6 g/cc | 44 g @ 1.6 g/cc |
| Flux Additive Used | None | Strong Flux | Strong Flux | Strong Flux | Strong Flux | Weak Flux | Weak Flux | Weak Flux |
| % Flux in Blend | 0 | 0.75 | 1.5 | 5 | 10 | 5 | 10 | 15 |
| Dry Glaze Application Wt. (g/SqFt) | 21 | 21 | 21 | 21 | 21 | 21 | 21 | 21 |
| PERFORMANCE | | | | | | | | |
| Abrasion Resistance Level | 6 | 6 | 4 or 5 | 3 | 1 | 4 or 5 | 4 or 5 | 4 or 5 |
| Abrasion Class | 4 | 4 | 3 | 2 | 0 | 3 or 4 | 3 | 3 |
| L*-SCI | 31.2 | 30.9 | 29.9 | 29.1 | 27.0 | 30.4 | 29.7 | 30.3 |
| 60-deg Gloss (Before Abrasion) | 1.0 | 1.1 | 1.2 | 5.3 | 45.0 | 1.5 | 1.35 | 1.3 |
| COF Dry | 1.0 | 0.9 | 0.8 | 0.9 | 0.9 | 0.9 | 0.9 | 0.9 |
| COF Wet | 0.8 | 0.8 | 0.9 | 0.6 | 0.4 | 0.6 | 0.6 | 0.6 |
| SCI-dE*-12k | 2.7 | 2.9 | 3.0 | 5.7 | 6.3 | 2.9 | 3.8 | 3.7 |
| dGloss-12k | 0.2 | 0.4 | 0.2 | −3.8 | −43.3 | 0.1 | 0.1 | 0.15 |
| Wt-Loss-12k | 0.27 | 0.42 | 0.14 | 0.24 | 0.25 | 0.25 | 0.24 | 0.26 |
| Dry Glaze Opacity % | 0.7 | 0.1 | −1.6 | −2.9 | −6.4 | −0.7 | −1.9 | −0.8 |
| Cleanability | 3 | 4 | — | 5 | — | 4 | 4 | 4 |

Abrasion Resistance Level and Abrasion Class provides measurements of wear resistance performance based on the point at which abrasion failure occurs. These properties were measured using ASTM C1027-99—Standard Test Method for Determining Visible Abrasion Resistance of Glazed Ceramic Tile.

L*-SCI provides a measurement of the appearance of the test sample prior to abrasion. L*-SCI describes the lightness of the sample color measured with the specular component included. L* is a derived quantity calculated from spectral reflectance data measured using a spectrophotometer and calculated using the CIE 1976 (L*, a*, b*) color space equacalculated for samples prepared using a black underlayer glaze with an L* of about 30.8 using the following formula:

Dry Glaze % Opacity=((  [L*with Dry Glaze]−[L*Underlayer])/(90−[L*Underlayer]))*100

Cleanability provides a measurement of the difficulty to remove a chromium oxide staining agent used in ASTM C1027-99. For the conditions detailed in Table 3, the staining agent was used on all samples after 12,000 abrasion cycles, and not just samples without abrasion failure as required by ASTM C1027-99. A cleanability rating between five and zero was assigned based on the following:

Rating of 5—Staining agent visibly removed with water and scrub brush

Rating of 4—Staining agent visibly removed with powdered household cleaner and scrub brush
Rating of 3—Staining agent visibly removed with weak acid and scrub brush
Rating of 2—Staining agent visibly removed with strong acid and scrub brush
Rating of 1—Staining agent visibly removed after 24 hour soak in solvent followed by scrub brush
Rating of 0—Staining Agent could not be visibly removed Example 4

Preparation of Wear Resistant Coatings Using Single-Component Dry Glaze

In this example, three different wear resistant glazes were produced, each providing different wear resistance and cleanability levels. In Example 1, the crystallizing component of the dry glaze and the underlayer glaze were kept constant, while the flux component was varied to produce the variation in properties of the final tile. In contrast, in this example, the dry glaze consists only of the crystallizing component, and the underlayer glaze was varied to produce the different final tile characteristics.

The crystallizing component (and, thus, the dry glaze) was identical to that used in Example 1, as shown in Table 2. That is, the crystallizing component for each sample included oxides of Si, Al, K, Mg, Ca, Zn, and Sr. The other constituents (i.e., oxides of Na, Fe, Ti, and Zr, as well as elemental carbon) were present only as unwanted impurities and were not intentionally included in the crystallizing component. Three different underlayer glazes were used, and the constituents thereof are shown in Table 5.

TABLE 5

Chemical composition ranges for underlayer glazes

| Compound | Glaze A - Lowest Fusibility WT % | Glaze B - Low Fusibility WT % | Glaze C - High Fusibility WT % |
|---|---|---|---|
| $SiO_2$ | 68 to 72 | 54 to 58 | 40 to 45 |
| $Al_2O_3$ | 18 to 22 | 20 to 24 | 22 to 26 |
| $Na_2O$ | 2 to 6 | 1 to 5 | 0 to 4 |
| $Fe_2O_3$ | 0 to 2 | 0 to 2 | 0 to 2 |
| $TiO_2$ | 0 to 2 | 0 to 2 | 0 to 2 |
| $K_2O$ | 0 to 2 | 0 to 2 | 0 to 2 |
| $P_2O_5$ | 0 to 2 | 0 to 2 | 0 to 2 |
| MgO | 0 to 2 | 0 to 2 | 0 to 2 |
| CaO | 0 to 2 | 4 to 8 | 9 to 13 |
| $ZrO_2$ | 0 to 2 | 0 to 2 | 1 to 4 |
| ZnO | 0 to 2 | 1 to 5 | 2 to 6 |
| BaO | 0 to 2 | 0 to 2 | 0 to 2 |
| Carbon | 0 to 2 | 0 to 4 | 1 to 5 |
| LOI | 1 to 5 | 4 to 8 | 6 to 10 |
| Sum | 100 | 100 | 100 |

The three underlayer glazes provided differing levels of fusibility (i.e., ability of the crystallizing component to fuse with, and into, the tile) for the crystallizing component. Glaze A, which was similar to the underlayer glaze used in Example 1, had the lowest fusibility, and thus provided the maximum protection against the crystallizing component melting into the surface of the tile during firing. Glaze B provided slightly less fusibility, but still generally maintained the crystallizing component on the surface of the underlayer glaze during firing. Finally, Glaze C, which provided the highest fusibility, was unable to prevent a substantial portion of the crystallizing component from melting into the surface of the tile during firing.

Figure 7:
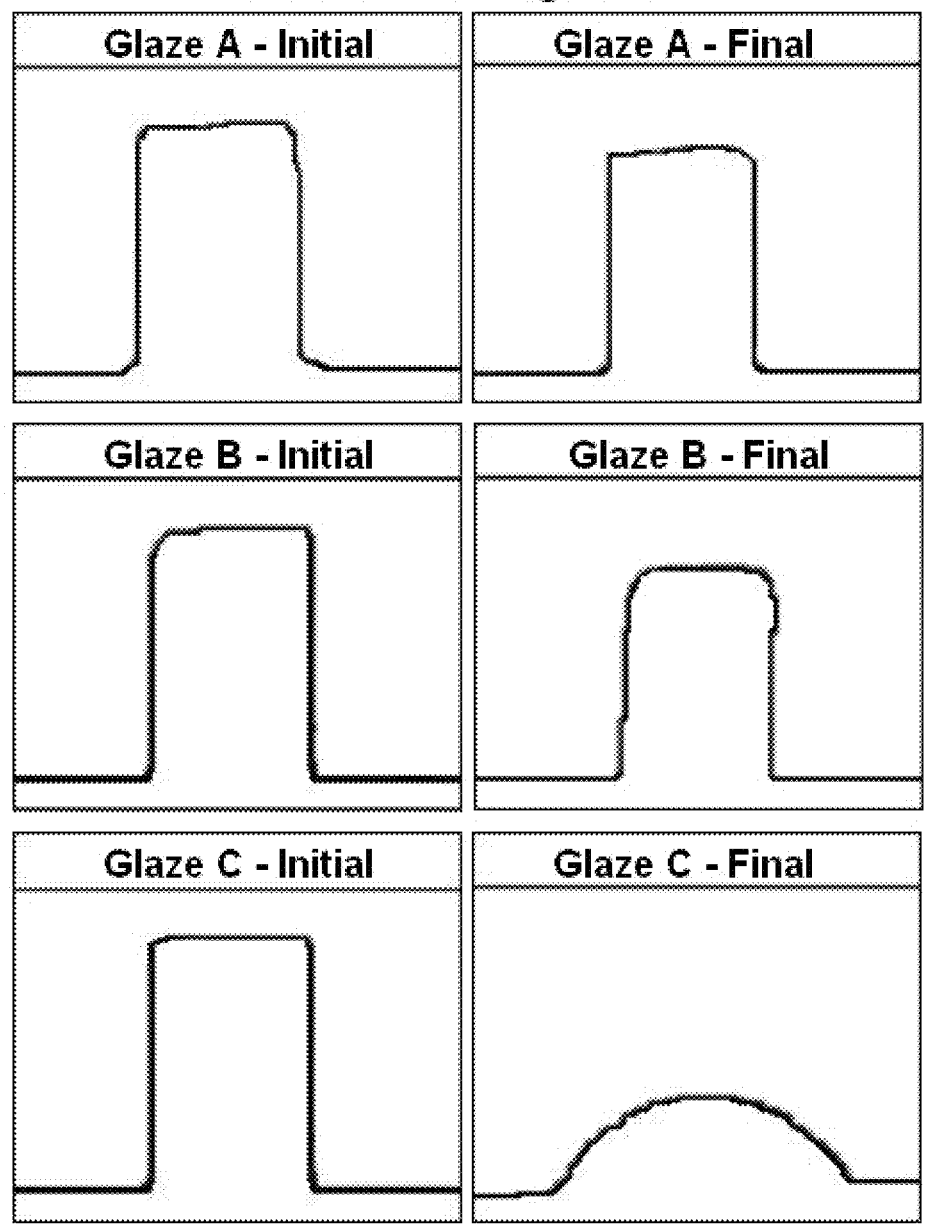
FIG. 7 illustrates, using hot stage microscopy, the firing behavior of three underlayer glazes described in Example 4.

The melting behavior of the three underlayer glazes used in this example is shown in the hot stage microscopy images of FIG. 7. The hot stage microscopy images of FIG. 7 verify the fusibility properties of the underlayer glazes. Based on the data in Table 5, the fusibility of the underlayer glaze decreases as the concentration of Si (and, to some extent, the Na) decreases and as the concentration of Al and Ca increase.

The firing cycle used was similar to that in Example 1. Ultimately, three different levels of wear resistance and cleanability were observed. The wear resistance of the final tile was inversely proportional to the fusibility of the underlayer glaze. That is, the maximum wear resistance was found for the tiles that employed Glaze A, while the lowest wear resistance was found for the tiles that employed Glaze C. In contrast, the cleanability was directly proportional to the fusibility of the underlayer glaze. That is, the maximum cleanability was found for the tiles that employed Glaze C, while the lowest cleanability was found for the tiles that employed Glaze A. Thus, one skilled in the art to which this disclosure pertains would understand that, in situations where cleanability is more desirable than wear resistance, Glaze C should be used (for this particular crystallizing component); while, in situations where wear resistance is more important than cleanability, Glaze A should be used. Finally, in situations where both produces are equally important, Glaze B should be used.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of this disclosure have been described in detail with particular reference to exemplary embodiments, those skilled in the art will understand that variations and modifications can be effected within the scope of the disclosure as defined in the appended claims. Accordingly, the scope of the various embodiments of the present invention should not be limited to the above discussed embodiments, and should only be defined by the following claims and all equivalents.

What is claimed is:

1. A wear resistant coating, comprising a strontium aluminosilicate glass-ceramic composition that is formed from a glaze that comprises a crystallizing component, wherein the crystallizing component comprises strontium, aluminum, and silicon, and wherein the crystallizing component comprises less than about 2 weight percent each of lithium, boron, barium, sodium, iron, titanium, zirconium, and carbon, based on a total weight of the crystallizing component, wherein the glaze exhibits no detectable strontium aluminum silicate crystalline phase prior to firing; and
   wherein the glaze further comprises a flux component, wherein the flux component comprises aluminum, silicon, sodium, calcium, potassium, and magnesium, and wherein the flux component comprises less than about 2 weight percent each of lithium, boron, barium, iron, titanium, phosphorus, zinc, and carbon.

2. The wear resistant coating of claim 1, wherein the crystallizing component further comprises one or more of: calcium, potassium, magnesium, or zinc.

3. The wear resistant coating of claim 1, wherein the strontium aluminosilicate glass-ceramic composition is $Sr(Al_2Si_2O_8)$.

4. The wear resistant coating of claim 1, wherein the flux component further comprises zirconium.

5. The wear resistant coating of claim 1, wherein the glaze comprises about 85 to about 97 weight percent of the crystallizing component and about 3 to about 15 weight percent of the flux component, based on a dry weight of the glaze.

6. The wear resistant coating of claim 1, wherein the wear resistant coating has an abrasion resistance of Class 4 or 5 as measured according to ASTM C1027-99 for all lightness values (L*) of greater than or equal to about 33 as measured using a CIE color space equation.

7. A coated tile, comprising: a ceramic tile; and a wear resistant coating disposed on a surface of the ceramic tile; wherein the wear resistant coating comprises a strontium aluminosilicate glass-ceramic composition that is formed from a glaze that comprises a crystallizing component; wherein the crystallizing component comprises strontium, aluminum, and silicon; and wherein the crystallizing component comprises less than about 2 weight percent each of lithium, boron, barium, sodium, iron, titanium, zirconium, and carbon, based on a total weight of the crystallizing component, wherein the glaze exhibits no detectable strontium aluminum silicate crystalline phase prior to firing; and
 wherein the glaze further comprises a flux component, wherein the flux component comprises aluminum, silicon, sodium, calcium, potassium, and magnesium, and wherein the flux component comprises less than about 2 weight percent each of lithium, boron, barium, iron, titanium, phosphorus, zinc, and carbon.

8. The coated tile of claim 7, wherein the crystallizing component further comprises one or more of: calcium, potassium, magnesium, or zinc.

9. The coated tile of claim 7, wherein the strontium aluminosilicate glass-ceramic composition is $Sr(Al_2Si_2O_8)$.

10. The coated tile of claim 7, wherein the flux component further comprises zirconium.

11. The coated tile of claim 7, further comprising an underlayer glaze interposed between the wear resistant coating and the surface of the ceramic tile.

12. The coated tile of claim 11, wherein the underlayer glaze comprises silicon, aluminum, sodium, and potassium, and wherein the underlayer glaze comprises less than about 2 weight percent each of lithium, boron, barium, iron titanium, phosphorus, and magnesium.

13. The coated tile of claim 12, wherein the underlayer glaze further comprises one or more of calcium, zinc or carbon.

14. The coated tile of claim 7, wherein the wear resistant coating has an abrasion resistance of Class 4 or 5 as measured according to ASTM C1027-99 for all lightness values (L*) of greater than or equal to about 33 as measured using a CIE color space equation.

15. A wear resistant coating, comprising a strontium aluminosilicate glass-ceramic composition that is formed from a glaze that comprises a crystallizing component, wherein the crystallizing component comprises strontium, aluminum, and silicon, and wherein the crystallizing component comprises less than about 2 weight percent each of lithium, boron, barium, iron, titanium, zirconium, and carbon, based on a total weight of the crystallizing component; and
 wherein the glaze further comprises a flux component, wherein the flux component comprises aluminum, silicon, sodium, calcium, potassium, and magnesium, and wherein the flux component comprises less than about 2 weight percent each of lithium, boron, barium, iron, titanium, phosphorus, zinc, and carbon.

16. A wear resistant coating, comprising a strontium aluminosilicate glass-ceramic composition that is formed from a glaze that comprises a crystallizing component and a flux component, wherein the crystallizing component comprises strontium, aluminum, silicon, and wherein the crystallizing component and the flux component together comprise less than about 2 weight percent each of lithium, boron, barium, iron, titanium, and carbon, based on a total weight of the crystallizing component, wherein the glaze exhibits no detectable strontium aluminum silicate crystalline phase prior to firing; and
 wherein the flux component comprises sodium, calcium, potassium, and magnesium.

* * * * *